US012579228B2

(12) United States Patent
Desikan et al.

(10) Patent No.: US 12,579,228 B2
(45) Date of Patent: Mar. 17, 2026

(54) METHOD AND SYSTEM FOR INVESTIGATING RESILIENCY OF A SOFTWARE APPLICATION

(71) Applicant: LTI Mindtree Ltd, Mumbai (IN)

(72) Inventors: Devanathan Desikan, Mumbai (IN);
Govindan Ramasamy, Mumbai (IN);
Mohammad Sohail, Mumbai (IN);
Nitin Pathak, Mumbai (IN)

(73) Assignee: LTI Mindtree Ltd., Mumbai (IN)

( * ) Notice: Subject to any disclaimer, the term of this patent is extended or adjusted under 35 U.S.C. 154(b) by 145 days.

(21) Appl. No.: 18/526,453

(22) Filed: Dec. 1, 2023

(65) Prior Publication Data

US 2025/0077631 A1     Mar. 6, 2025

(51) Int. Cl.
*H04L 29/00* (2006.01)
*G06F 21/12* (2013.01)
*G06F 40/40* (2020.01)

(52) U.S. Cl.
CPC .............. *G06F 21/12* (2013.01); *G06F 40/40* (2020.01)

(58) Field of Classification Search
CPC ................................. G06F 21/12; G06F 40/40
USPC .......................................................... 713/189
See application file for complete search history.

(56) References Cited

U.S. PATENT DOCUMENTS

2021/0263836 A1* 8/2021 Singh .................. G06F 11/3698
2022/0070203 A1* 3/2022 Kao ..................... H04L 63/1433
2022/0210200 A1* 6/2022 Crabtree .............. G06F 16/951

* cited by examiner

*Primary Examiner* — Jeffrey C Pwu
*Assistant Examiner* — Michael D Anderson
(74) *Attorney, Agent, or Firm* — CHIP LAW GROUP

(57) ABSTRACT

The invention provides an intelligent resiliency engineering module for investigating resiliency of a software application, wherein the module is configured to identify business transactions associated with the software application to determine observability scenarios and orchestrate chaos engineering in a target infrastructure. The intelligent resilience engineering module identifies chaos simulation scenarios and a target infrastructure for the software application, to inject the one or more chaos simulation scenarios to simulate and orchestrate chaos attacks and the business transaction in the target infrastructure. Based on the simulation and orchestration, a correlation module by leveraging Artificial Intelligence (AI) models, correlates infrastructure telemetry data with Software Development Lifecycle (SDLC) digital assets. A predictive insights module predicts target infrastructure hotspots based on the correlation, current behavior of the target infrastructure, and behavioral conditions inferred based on historical insights on similar chaos simulation scenarios.

13 Claims, 3 Drawing Sheets

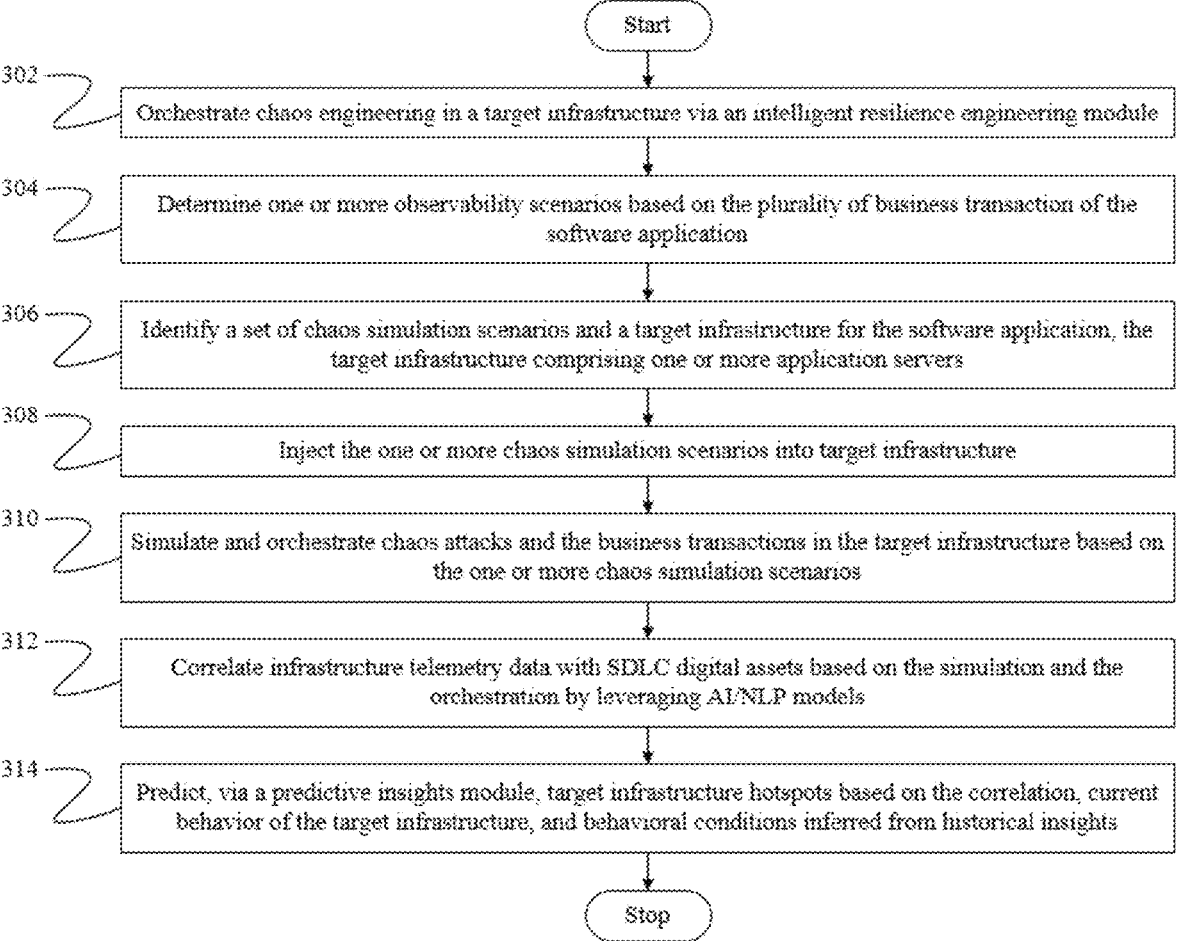

302 — Orchestrate chaos engineering in a target infrastructure via an intelligent resilience engineering module 304 — Determine one or more observability scenarios based on the plurality of business transaction of the software application 306 — Identify a set of chaos simulation scenarios and a target infrastructure for the software application, the target infrastructure comprising one or more application servers 308 — Inject the one or more chaos simulation scenarios into target infrastructure 310 — Simulate and orchestrate chaos attacks and the business transactions in the target infrastructure based on the one or more chaos simulation scenarios 312 — Correlate infrastructure telemetry data with SDLC digital assets based on the simulation and the orchestration by leveraging AI/NLP models 314 — Predict, via a predictive insights module, target infrastructure hotspots based on the correlation, current behavior of the target infrastructure, and behavioral conditions inferred from historical insights

FIG. 3

METHOD AND SYSTEM FOR INVESTIGATING RESILIENCY OF A SOFTWARE APPLICATION

RELATED APPLICATIONS

This application claims priority to, and benefit from Indian Patent Application number 202321058910, filed on Sep. 2, 2023, entitled "METHOD AND SYSTEM FOR INVESTIGATING RESILIENCY OF A SOFTWARE APPLICATION", the entire content of which is incorporated herein by reference in its entirety.

FIELD OF THE INVENTION

Various embodiments of the present invention generally relate to investigating software resiliency. More specifically, the present invention relates to a method and system for investigating resiliency of a software application by simulating a selected set of chaos scenarios in a target infrastructure and thereby correlating infrastructure telemetry data with Software Development Life Cycle (SDLC) digital assets to provide insights to site resilient engineers to make informed decisions and take proactive actions.

BACKGROUND OF THE INVENTION

Software resilience is the ability of a software to react to problems in one of its components or an external system and still provide the best possible service. Resiliency has become more important as organizations continue to rapidly implement software across multi-tier, multiple technology infrastructures.

Software systems are increasingly being relied upon to support critical business operations, making their reliability and robustness essential to the success of an organization. Current resilience monitoring methods are reactive in nature and often fail to detect issues until they have already impacted the software's functionality. This results in costly downtime, lost revenue, and damage to a company's reputation.

Additionally, the existing resilience testing products and methods are not design intrusive and fail to offer well integration with the client ecosystem. This demands a high level of security compliance and robustness to ensure that the system is not disrupting client business operations.

One of the potential solutions to investigate software resiliency is implementing chaos engineering/attacks to perform software stress testing. Also, chaos engineering corresponds to the practice of experimenting with a distributed system in production to build confidence in the system's capability to withstand turbulent conditions. In particular, chaos engineering involves the creation of a hypothesis around a steady-state mode of the distributed system in order to define acceptable thresholds for a normal operating state as well as when the distributed system is experiencing turbulence. Hypotheses are tested via experiments, e.g., chaos engineering experiments, in order to determine if the distributed system behaves as expected, i.e., validates the hypothesis, or not, i.e., violates/invalidates the hypothesis.

However, in the existing process of chaos engineering, selecting the right set of chaos scenarios and injecting the selected chaos scenarios into the target infrastructure is not well crafted. There is always a need for an efficient manner of selecting the right set of chaos scenarios in accordance with the target infrastructure.

Further, none of the existing chaos engineering products provide a potential solution to a need for rapidly growing proactive resilience engineering. This can be addressed only by orchestrating chaos engineering by intelligently selecting the right set of chaos injections and the target infrastructure. This will help resilience engineers to be proactive and be relevant to the current release changes.

Further, the existing market is limited in offering solutions which run chaos engineering using cloud-based services and agent-based services. None of the existing solutions offer agentless injection or simulation of chaos attacks which enable simulation at client premises without any disruption.

Furthermore, current market solutions do not offer the capability to seamlessly integrate infrastructure telemetry with SDLC (Software Development Life Cycle) digital assets. This limitation significantly hinders the ability of reliability engineers to obtain end-to-end visibility when diagnosing issues and effectively responding to incidents in a timely manner.

Moreover, existing solutions lack a well-established and appropriately focused feedback loop between development and operations. For instance, there is no direct method to ascertain if any defects present in the development environment are related to the current incident in production. As a consequence, this lack of connectivity and information leads to time-consuming efforts in issue resolution, ultimately impacting the application's availability and, consequently, the overall customer experience.

To overcome the aforementioned drawbacks, it is imperative to undertake significant development efforts for an innovative solution that can proactively monitor software resilience and detect issues before they have a chance to cause significant damage.

Therefore, there exists a need for a method and system that investigates software resiliency impact on target infrastructure due to changes introduced in software applications in an enterprise by intelligently selecting and simulating the right set of chaos scenarios in target infrastructure and thereby correlating infrastructure telemetry data with historical patterns to derive insights proactively.

SUMMARY OF THE INVENTION

The invention discloses a method and system for investigating resiliency of a software application. The method and system comprise an intelligent resilience engineering module configured to identify business transactions associated with the software application to determine observability scenarios and orchestrate chaos engineering in a target infrastructure. The intelligent resilience engineering module identifies one or more chaos simulation scenarios and a target infrastructure for the software application, to inject the one or more chaos simulation scenarios.

After injecting, the intelligent resilience engineering module simulates and orchestrates chaos attacks and the business transaction in the target infrastructure, wherein the chaos attacks are simulated based on the one or more chaos simulation scenarios and the one or more observability scenarios. Based on the simulation and orchestration, a correlation module by leveraging Artificial Intelligence (AI) models, correlates infrastructure telemetry data with Software Development Lifecycle (SDLC) digital assets. A predictive insights module predicts target infrastructure hotspots based on the correlation, current behavior of the target infrastructure, and behavioral conditions inferred based on historical insights on similar chaos simulation scenarios.

One or more advantages of the prior art are overcome, and additional advantages are provided through the invention. Additional features are realized through the technique of the invention. Other embodiments and aspects of the disclosure are described in detail herein and are considered a part of the invention.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

FIG. 3 is a flow chart illustrating a method for investigating resiliency of a software application in accordance with an embodiment of the invention.

Figure 1:
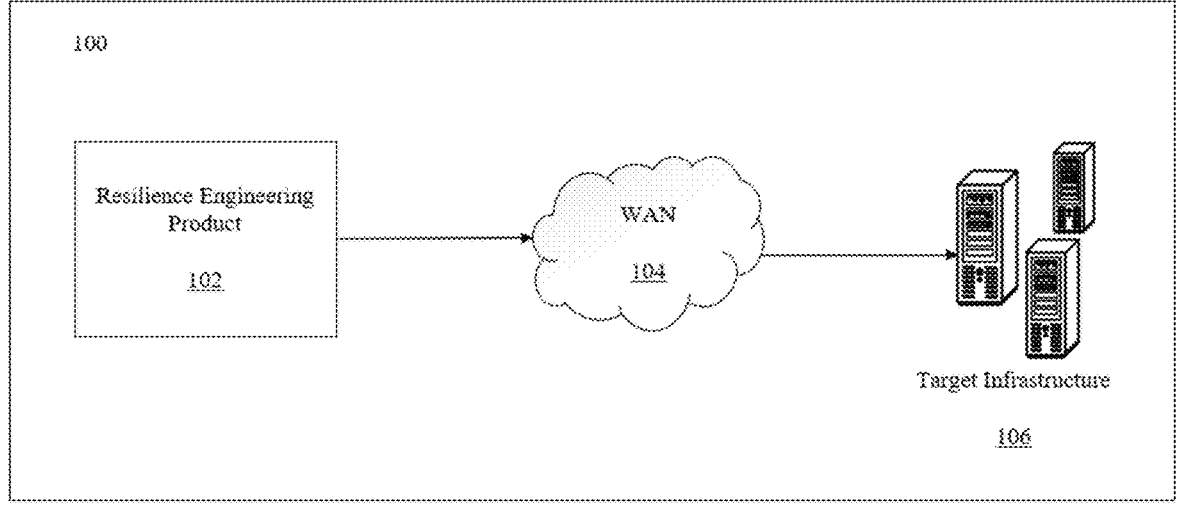
FIG. 1 is a diagram that illustrates an environment in which various embodiments of the invention can be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and components related to a method and system for investigating resiliency of a software application. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Systems for investigating resiliency of a software application, methods for investigating resiliency of a software application, and non-transitory computer readable media having stored thereon machine-readable instructions to investigate resiliency of a software application are disclosed herein. The systems, methods, and non-transitory computer readable media disclosed herein investigates resiliency of a software application using an intelligent resilience engineering module that orchestrates chaos engineering in a target infrastructure by injecting and simulating chaos attacks based on identified business transactions of the software application. It is important to note that investigating resiliency of the software application disclosed in the present invention does not mean directly injecting and simulating chaos attacks. Instead, the goal is to derive insights using Artificial Intelligence (AI) and/or Natural Language (NL) models to help site resilient engineers to take informed decisions and proactive actions to mitigate system failures.

In one general aspects of this disclosure, a system of one or more computer executable software and data, computer machines and components thereof, networks, and/or network equipment can be configured to perform particular operations or actions individually, collectively, or in a distributed manner to cause the system of components thereof to perform resiliency investigation of a software application by identifying one or more chaos scenarios and simulating chaos attacks in a target infrastructure with one or more applications servers, and correlate infrastructure telemetry data with Software Development Lifecycle (SDLC) digital assets based on the simulation to predict infrastructure hotspots.

Infrastructure telemetry refers to collecting, transmitting, and measuring data from infrastructure (computing) resources. A plurality of sensors integrated into the infrastructure resources are used to collect the data in real time.

Telemetry is used in computing infrastructures to provide metrics regarding computation and compute resources, such as metrics on the central processing unit, memory, storage, devices etc. Telemetry is used to monitor systems, perform usage analytics, find performance bottlenecks, identify issues, and predict future system load, to name a few examples. Collecting, analyzing, and acting on telemetry data in the computing environment is hugely beneficial to both the platform/infrastructure owner such as the cloud service provider, to the enterprise and to tenants, e.g., CSP customers such as computing nodes of the infrastructure which develop and deploy applications.

For example, the telemetry data may include, but is not necessarily limited to, usage data, utilization metrics (e.g., the percentage of available resources being used), error metrics, power information (e.g., power consumed during designated time periods and/or workloads), and/or temperature information (e.g., ambient air temperature) near the components of the computing infrastructure. One or more of these different types of telemetry data may be obtained for each of the hardware components, the interface of the hardware component, and the node containing the hardware component and its interface.

In some non-limiting embodiments, telemetry data include one or more of processor telemetry data, operating system telemetry data, virtual switch telemetry data, storage subsystem telemetry data, host bus adapter telemetry data, network interface card telemetry data, platform telemetry signals, physical switch telemetry data, or router telemetry data.

In yet some non-limiting embodiments, the telemetry data encompasses a range of performance metrics related to the utilization of system resources. This includes, but is not limited to, information such as processor cache usage, current memory bandwidth usage, and current I/O bandwidth utilization by each guest system or its constituent components (e.g., threads, applications, services, etc.).

Additionally, telemetry data may encompass the bandwidth of individual I/O devices (e.g., Ethernet devices or hard disk controllers).

Furthermore, the telemetry data may include metrics such as the number of memory accesses per unit of time and the cumulative utilization duration of various hardware components throughout their operational lifespan. These hardware components can comprise CPUs, GPUs, VPUs, FPGAs, ASICs, network processors, switches, hubs, routers, SSDs, HDDs, RAM, ROM, NICs, and more.

Utilization metrics provide a quantitative assessment of resource consumption. They can be measured as a percentage of available resources utilized per process (e.g., computing power allocated to a specific process as a percentage of the total computing power of a node) or in the aggregate (e.g., the percentage of total computing power consumed by an individual processor within a node).

In addition, the telemetry data may encompass information regarding the availability of memory space or bandwidth, as well as the availability of processor cache space or bandwidth. Moreover, temperatures, currents, and/or voltages can be collected from various points within the computing infrastructure. These points include locations within each core, chipsets associated with processors in a computing node, chipsets associated with accelerators in an accelerator node, or any other suitable locations within the target infrastructure.

Further telemetry data can include the current level of redundancy employed to maintain different parts of the computing infrastructure in a functional state. For instance, this may involve assessing the level of redundancy present in specific hardware components within a node (e.g., the number of redundant or backup CPUs in a compute node, the number of redundant SSD devices in a memory node, the number of GPUs in a GPU accelerator node, etc.). Additionally, the level of redundancy in particular nodes (e.g., compute node, memory node, accelerator node, network node, storage node) within a rack, floor, building, zone, or the entire computing infrastructure, etc., can be obtained.

The term "Software Development Lifecycle" (SDLC), as disclosed herein, refers to the process employed by the software industry to design, develop, and test software of high quality. The SDLC aims to produce software that meets or exceeds customer expectations, while adhering to specified completion timeframes and cost estimates. In other words, the SDLC, as disclosed herein, also encompasses a dashboard of information that enables technology leaders to assess the overall performance of their entire software development organization.

In the context of SDLC, digital assets encompass a diverse array of elements integral to a software development project. These assets may comprise but are not limited to, documentation, test plans, images, data files, executable modules, user stories, source code, defects, incidents, application log files, test cases, build and deploy statistics (e.g., success, failure, error, and warning codes), messages, or any other pertinent components. Additionally, digital assets encompass artifacts such as design documents, data models, workflow diagrams, test matrices and plans, setup scripts, and similar materials that play crucial roles throughout the development process.

As used throughout this specification, computer-executable software and data can include one or more of algorithms, software applications, business transactions, chaos scenarios, chaos engineering, observability scenarios, insights, alerts, recommendations, databases, datasets (e.g., historical datasets), drivers, data structures, firmware, graphical user interfaces, instructions, machine learning (i.e., supervised, semi-supervised, reinforcement, and unsupervised), middleware, modules, objects, operating systems, processes, programs, scripts, tools (e.g., for stress testing and chaos stress testing), and utilities.

The computer-executable software and data is stored in tangible, non-volatile, computer-readable memory (locally or in network-attached storage) and can operate autonomously, on-demand, on a schedule, and/or spontaneously. Computer machines can include one or more: general-purpose or special-purpose network-accessible personal computers, desktop computers, laptop or notebook computers, distributed systems, workstations, portable electronic devices, facsimile machines, multifunction devices, and/or servers having one or more microprocessors for executing or accessing the computer-executable software and data.

The servers can be virtual or physical, on-premise or remote, and can include one or more: application servers, cybersecurity servers, test servers, and/or web servers for executing, accessing, and/or storing the computer-executable software and data. Computer networks can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of any of the same. Networks also include associated network equipment such as access points, ethernet adaptors (physical and wireless), firewalls, hubs, modems, routers, and/or switches located inside the network and/or on its periphery, as well as software executing on any of the foregoing.

Pursuant to various embodiments, the intelligent resilience engineering module identifies business transactions associated with the software application to determine observability scenarios and orchestrate chaos engineering in a target infrastructure. Business transactions of the software application can be referred to as one or more operations of the software application in a distributed network or infrastructure of an entity or an enterprise.

Orchestrating chaos is a method for testing distributed software. It involves intentionally introducing failure and faulty scenarios to assess the software's resilience against random disruptions. Such disruptions can lead to unpredictable application behavior and vulnerabilities under pressure. The method incorporates orchestration intelligence, enabling users to automate the selection of target servers based on code commits and infrastructure changes. The system offers suggestions for running orchestrated attack suites through customized templates, derived from a comprehensive analysis of historical attacks on the servers. Additionally, the method provides recommendations, including scaling up and down, to aid in cost budgeting for servers in advance. The auto-orchestration suite also includes pre-defined templates for orchestrating attacks specific to client environments, ensuring faster execution. It incorporates online update methodologies to continuously enhance the intelligence of the orchestration knowledge base, based on user feedback.

The intelligent resilience engineering module identifies one or more chaos simulation scenarios and a target infrastructure for the software application, to inject the one or more chaos simulation scenarios. After injecting, the intelligent resilience engineering module simulates and orchestrates chaos attacks and the business transaction in the target infrastructure, wherein the chaos attacks are simulated based on the one or more chaos simulation scenarios and the one or more observability scenarios. Based on the simulation and orchestration, a correlation module by leveraging AI models, correlates infrastructure telemetry data with SDLC digital assets. A predictive insights module predicts target infrastructure hotspots based on the correlation, current behavior of the target infrastructure, and behavioral conditions inferred based on historical insights on similar chaos simulation scenarios.

FIG. 1 is a diagram that illustrates an environment 100 in which various embodiments of the invention can be implemented. Referring to FIG. 1, environment 100 comprises a resilience engineering product 102, a WAN 104, and a target infrastructure 106.

The resilience engineering product 102 is an intelligent, insights-driven engineering solution that leverages advanced analytics and machine learning (ML) algorithms to continuously analyze performance patterns of software applications, identify potential vulnerabilities, and detect infrastructure hotspots. By utilizing advanced analytics and ML algorithms, the resilience engineering product 102 monitors real-time infrastructure telemetry data and correlates it with historical events and hotspots. This enables architects, site reliability engineers, and operations engineers to make informed decisions and proactively engineer resilient applications.

In one embodiment, the resilience engineering product 102 facilitates communication and collaboration between development teams and operations teams within an enterprise, enhancing the overall efficiency and effectiveness of the software development process. By providing real-time insights, alerts, and reports to resilient engineers, the resilience engineering product 102 promotes seamless coordination between these teams. Furthermore, it establishes a correlation between infrastructure telemetry and the digital assets of the Software Development Lifecycle (SDLC), enabling a deeper understanding of how software applications behave with changes introduced throughout the development lifecycle.

In an exemplary embodiment, while constantly monitoring a target infrastructure, if the resilient engineering product 102 determines that there is a sudden spike in utilization of a central processing unit (CPU), which is not a usual pattern of an application server, the resilience engineering product 102 correlates the application server with one or more applications running in the server to observe changes introduced in the one or more applications recently, types of changes introduced, user stories, associated source codes to get an overview of lineage from business requirements to the operations impact. Based on the correlation, the resilient engineering product 102 provides a plurality of predictive insights to site resilient engineers to make informed decisions and take proactive actions.

In an embodiment, the resilience engineering product 102 communicates with the target infrastructure 106 via the WAN 104, to investigate the impact of software resiliency on the target infrastructure 106. The WAN 104 of the environment 100 is any wide area network (for example, the internet) capable of communicating computer data over non-local distances by any technology for communicating computer data, now known or to be developed in the future. In some embodiments, the WAN 104 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

In some embodiments, the WAN 104 of the environment 100 may utilize clustered computing and components acting as a single pool of seamless resources when accessed through the WAN 104 by one or more computing systems. For example, such embodiments can be used in a data center, cloud computing network, storage area network (SAN), and network-attached storage (NAS) applications.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

A cloud computing environment is service-oriented, focusing on statelessness, low coupling, modularity, and semantic interoperability. At the heart of cloud computing is an infrastructure that includes a network of interconnected nodes.

In some non-limiting embodiments, the cloud computing environment includes a cloud network comprising one or more cloud computing nodes with which cloud consumers may use the end-user device(s) or client devices to access one or more software products, services, applications, and/or workloads provided by cloud service providers or tenants of the cloud network. Examples of the user device are depicted and may include devices such as a desktop computer, laptop computer, smartphone, or cellular telephone, tablet computers, and smart devices such as a smartwatch or smart glasses. Nodes may communicate with one another and may be grouped (not shown) physically or virtually in one or more networks, such as Private, Community, Public, or Hybrid clouds as described hereinabove, or a combination thereof. This allows the cloud computing environment to offer infrastructure, platforms, and/or software as services for which a cloud consumer does not need to maintain resources on a local computing device.

Public Cloud is any computer system available for use by multiple entities that provides on-demand availability of computer system resources and/or other computer capabilities, especially data storage (cloud storage) and computing power, without direct active management by the user.

Private Cloud is similar to the public cloud, except that the computing resources are only available for use by a single enterprise. While the private cloud is depicted as being in communication with WAN, in other embodiments, a private cloud may be disconnected from the internet entirely and only accessible through a local/private network.

A hybrid cloud is composed of multiple clouds of different types (for example, private, community, or public cloud types), often implemented by different vendors. Each of the multiple clouds remains a separate and discrete entity. Still, the larger hybrid cloud architecture is bound together by standardized or proprietary technology that enables orchestration, management, and/or data/application portability between the multiple constituent clouds.

The target infrastructure 106 can include but not limited to, application servers, network-attached devices such as, routers, switches, hubs, firewalls, workstations, databases, desktop computers, printers, and wireless access devices. The target infrastructure 106 typically receives helpful and useful data from the operations in the environment 100. For example, in a hypothetical case where the resilience engineering product 102 is designed to investigate resiliency impact on the target infrastructure 106, the investigation would typically be communicated via the WAN 104 of the environment 100. In some embodiments, the targe infrastructure 106 may be a client device, such as thin client, heavy client, mainframe computer, and so on.

Figure 2:
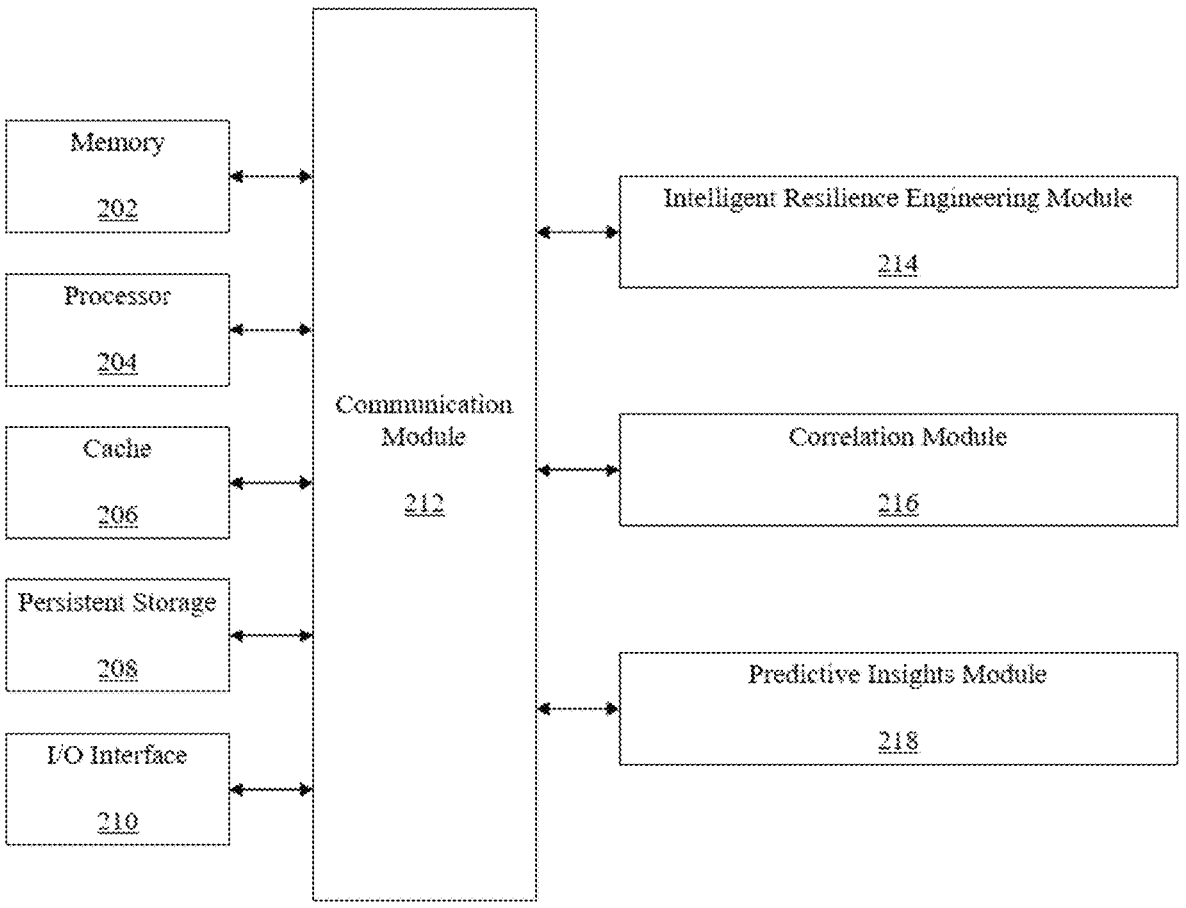
FIG. 2 illustrates a system for investigating resiliency of a software application in accordance with an embodiment of the invention.

FIG. 2 illustrates a system 200 diagram of the resilience engineering product 102, for investigating resiliency of a software application in accordance with an embodiment of the invention. Referring to FIG. 2, the system 200 includes a memory 202, a processor 204, a cache 206, a persistent storage 208, a I/O interface 210, a communication module 212, an intelligent resilience engineering module 214, a correlation module 216, and a predictive insights module 218.

The memory 202 may comprise suitable logic and/or interfaces that may be configured to store instructions (for example, the computer-readable program code) that can implement various aspects of the present invention. In an embodiment, the memory 202 includes random access memory (RAM). In general, the memory 202 can include any suitable volatile or non-volatile computer-readable storage media.

The processor 204 may comprise suitable logic, interfaces, and/or code that may be configured to execute the instructions stored in the memory 202 to implement various functionalities of the system 200 in accordance with various aspects of the present invention. The processor 204 may be further configured to communicate with multiple modules of the system 200 via the communication module 212.

The cache 206 is a memory that is typically used for data or code that should be available for rapid access by the threads or cores running on the processor 204. Cache memories are usually organized into multiple levels depending upon relative proximity to the processing circuitry. Alternatively, some, or all, of the cache for the processor set may be located "off-chip".

Computer readable program instructions are typically loaded onto the system 200 to cause a series of operational steps to be performed by the processor 204 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as the cache 206 and the other storage media discussed below. The program instructions, and associated data, are accessed by the processor 204 to control and direct the performance of the inventive methods.

The persistent storage 208, is any form of non-volatile storage for computers that is now known or to be developed in the future. The non-volatility of this storage means that the stored data is maintained regardless of whether power is being supplied to the system 200 and/or directly to the persistent storage 208. The persistent storage 208 may be a read only memory (ROM). Still, typically at least a portion of the persistent storage allows writing of data, deletion of data, and re-writing of data. Some familiar forms of persistent storage include magnetic disks and solid-state storage devices. The media used by persistent storage 208 may also be removable. For example, a removable hard drive may be used for persistent storage 208. Other examples include optical and magnetic disks, thumb drives, and smart cards inserted into a drive for transfer onto another computer-readable storage medium that is also part of persistent storage 208.

The I/O interface 210 allows input and output of data with other devices that may be connected to each computer system. For example, the I/O interface(s) 210 may provide a connection to an external device(s) such as a keyboard, a keypad, a touch screen, and/or some other suitable input device. External device(s) can also include portable computer-readable storage media, such as, for example, thumb drives, portable optical or magnetic disks, and memory cards. Program instructions and data (e.g., software and data) used to practice embodiments of the present invention can be stored on such portable computer-readable storage media and loaded onto the persistent storage 208 via the I/O interface(s) 210.

In one embodiment of the invention, the intelligent resilient engineering module 214 orchestrates chaos engineering by identifying a plurality of business transactions associated with the software application operating within the target infrastructure 106. The target infrastructure includes one or more application servers.

Leveraging one or more machine learning (ML) models, the intelligent resilience engineering module 214, based on the identified business transactions of the software application, determines one or more observability scenarios. These observability scenarios aid in the analysis and understanding of the system's behavior and performance during chaos engineering experiments. The intelligent resilient engineering module 214 leverages these scenarios to identify potential issues or areas of improvement. The observability scenarios may include, but are not limited to, CPU utilization, network latency, memory leaks, response time degradation, error rate analysis, and resource utilization distribution.

CPU utilization observability scenario involves monitoring and analyzing the CPU utilization of the software application during chaos engineering experiments. By examining the CPU usage patterns, spikes, or abnormal behavior, potential performance issues or bottlenecks can be detected.

Network latency observability scenario focuses on observing the network latency within the target infrastructure during chaos engineering experiments. By measuring the time it takes for data packets to traverse the network, insights can be gained into network congestion, latency fluctuations, or potential performance degradation.

Memory leaks observability scenario involves detecting and analyzing memory leaks within the software application during chaos engineering experiments. By monitoring the memory usage over time, potential memory leaks or inefficient memory management practices can be identified.

Response time degradation observability scenario focuses on observing the response time of the software application under different stress or load conditions. By measuring the time it takes for the application to respond to user requests, any degradation in response time can be detected, indicating potential performance issues.

Error rate analysis observability scenario involves monitoring and analyzing the occurrence of errors or exceptions within the software application during chaos engineering experiments. By tracking the frequency and types of errors encountered, insights can be gained into potential software bugs, vulnerabilities, or stability issues.

Resource utilization distribution observability scenario focuses on observing the distribution of resource utilization across different components or nodes of the target infrastructure. By analyzing the allocation and utilization of resources such as CPU, memory, and storage, potential imbalances or inefficiencies can be identified.

These observability scenarios play a crucial role in assessing the performance, reliability, and resilience of the software application and the target infrastructure. The intelligent resilience engineering module 214 utilizes these scenarios to gather meaningful insights and facilitate improvements, thereby enhancing the overall performance and stability of the software application.

Furthermore, the ML models disclosed herein encompass a broad range of models that utilize machine learning algorithms to perform specific tasks. These models can be trained or configured using input data, often referred to as training data, to enable the provision of a particular service. It should be noted that the term "model" as used herein can also refer to an untrained machine learning model. The examples provided in this disclosure are not limited to any specific type of ML algorithm or model but rather are applicable to a variety of algorithms/models that leverage training data.

Examples of ML algorithms/models that can be employed include, but are not limited to, support vector machines (including linear or non-linear binary classifiers and multi-class classifiers), deep learning algorithms/models, decision tree algorithms/models (such as decision tree classifiers), k-nearest neighbor (KNN) clustering algorithms/models, gradient boosted or gradient descent algorithms/models, and more.

Following the determination of one or more observability scenarios, the intelligent resilient engineering module 214 proceeds to identify a set of chaos simulation scenarios. This identification is accomplished by utilizing advanced data analytics and the one or more ML models integrated into the system.

In one embodiment, the chaos simulation scenarios disclosed herein pertain to actions that impact the software components, infrastructure components, and/or resources required by the infrastructure components. These scenarios can involve various operations combined together to achieve the desired chaos impact on the target infrastructure 106.

Following the determination of one or more observability scenarios, the intelligent resilient engineering module 214 proceeds to load the selected set of chaos simulation scenarios from a database. These scenarios may include, but are not limited to, High CPU utilization, RAM & Disk Memory consumption, High Network Latency, Voluminous I/O operations, Network Loss, Network Corruption, Server Shutdown, Network bandwidth issues, Page Faults, CPU Cache, and Socket Stress. The database contains relevant information related to the identified chaos simulation scenarios, utilizing a common data model to correlate and cluster data from various tools, such as software development tools like requirement management, test case management, defect management, version control, and application performance monitoring systems, among others.

This correlated database offers various software engineering personas the ability to derive valuable insights, including predictive insights to improve observability and predict performance bottlenecks, application hotspots, and capacity planning based on historical telemetry insights. Additionally, it provides advisory for resolution in cases of known failures, enabling better diagnostics and faster resolution in the future by identifying patterns and contextual clusters. Moreover, the correlation extends beyond application performance monitoring (APM) into the software development life cycle (SDLC), facilitating continuous feedback between Development and Operations to ensure high availability and a comprehensive understanding of engineering enhancements and their impact on application behavior.

The loaded set of chaos simulation scenarios is then injected into the target infrastructure 106, which may consist of one or more application servers. Subsequently, the intelligent resilience engineering module 214 proceeds to simulate chaos attacks and business transactions within the target infrastructure 106 based on the identified chaos simulation scenarios and the observability scenarios. The target infrastructure 106 may encompass a variety of network-attached devices such as routers, switches, hubs, firewalls, workstations, databases, printers, and wireless access devices.

In an embodiment, the intelligent resilience engineering module 214 is configured to implement an agentless simulation. This capability allows for the simulation of chaos scenarios within client premises without causing any disruption.

In another embodiment, the intelligent resilience engineering module 214 is also configured to implement simulation using cloud-based services. This allows for the simulation of chaos scenarios through remote services, providing flexibility and scalability in conducting the simulations.

The correlation module 216 configured to correlate infrastructure telemetry data with SDLC digital assets based on the simulation and the orchestration by leveraging one or more ML/Natural Language Processing (NLP) models. By analyzing and correlating these data sets, insights can be derived regarding the relationship between infrastructure telemetry and the behavior of SDLC digital assets.

In some non-limiting embodiment, the telemetry data disclosed herein may encompass various types of data, including usage data, utilization metrics, error metrics, power information, and temperature information near the components of the target infrastructure 106. These different types of telemetry data may be obtained for each hardware component, its interface, and the node that houses the hardware component and its interface.

The system 200 further comprises a tracing module (not shown in FIG. 2) in communication with the correlation module 214. The tracing module is designed to trace and record a chain of impacts starting from the target infrastructure 106, extending to the one or more application servers, then to the services operating on the application servers, and finally to the SDLC digital assets. This allows for a comprehensive understanding of the dependencies and interactions between different components within the system.

The predictive insights module 218 is configured to predict target infrastructure hotspots by correlating the current behavior of the target infrastructure 106 with behavioral conditions inferred from historical insights on similar chaos simulation scenarios. Leveraging advanced analytics and ML algorithms, the predictive insights module 216 continuously identifies patterns in the performance of the software application, potential vulnerabilities, and hotspots within the target infrastructure 106.

The recommendation engine (not shown in FIG. 2) utilizes insights derived from the predictive insights module 218, historical data correlation, and predictive analytics to provide recommendations and guidance to architects, site reliability engineers (SREs), and operations engineers. These recommendations enable them to proactively engineer software applications to be resilient.

In an exemplary embodiment, the recommendations may include suggestions such as the installation of an operating system, kernel, or basic input/output system (BIOS). They may also involve recommendations for applications that interact with human users, applications that manage computer resource(s), hypervisors, emulation software, virtual machines, and suggestions regarding changes to a plurality of software configurations for the at least one server computer.

In another exemplary embodiment, the recommendations may involve additions of hardware components such as servers, storage devices, cooling devices, processors, memory, and network communication-related hardware.

In yet another exemplary embodiment, the recommendations may encompass various firmware-related suggestions. These suggestions can include the installation of firmware for components such as the operating system, kernel, basic input/output system (BIOS), applications that interact with human users, applications that manage computer resource(s), hypervisors, emulation software, virtual machines, firmware for a component of the at least one server computer, and changes to a plurality of firmware configurations for the at least one server computer.
Exemplary Scenario Consider an exemplary scenario where the intelligent resilience engineering module 212 orchestrates chaos simulation in the target infrastructure 106 to proactively derive insights based on the correlation of infrastructure telemetry with historical patterns. The intelligent resilience engineering module 212 guides site engineers to take proactive actions in order to mitigate potential damage.

In accordance with this scenario, the intelligent resilience engineering module 212 initiates the onboarding process for a software application into the resilience engineering product 102. Upon onboarding the software application, the module identifies a plurality of business transactions associated with the application to determine one or more observability scenarios.

In an exemplary embodiment, the software application can be a Life Insurance Application and/or a Medical Insurance Application, and key business transactions can be such as, but not limited to, creating group term insurance, updating existing policy, estimate premium for insurance coverage, an amendment to existing policy, terminate a contract, and renew expiring policy.

Based on the determined observability scenarios, the intelligent resilience engineering module 212 identifies the appropriate set of chaos simulation scenarios to be injected into one or more application servers within the target infrastructure 106.

Upon injecting the right set of chaos simulation scenarios for the software application, the intelligent resilience engineering module 212 triggers the simulation of chaos attacks within the application servers. The purpose of this simulation is to observe the impact on the target infrastructure 106.

The impact on the target infrastructure 106 can manifest in various forms, including but not limited to changes in resource utilization (e.g., unexpected spikes from 10% to 35% due to increased demand), error metrics, power consumption (e.g., increased utilization from 30% to 70% during specific time periods or workloads), and abnormal temperature variations (e.g., from 40 degrees Fahrenheit to 80 degrees Fahrenheit) near the components of the computing infrastructure.

Based on the assessed impact, the intelligent resilience engineering module 212 triggers the correlation module 216, which correlates infrastructure telemetry data with SDLC digital assets. This correlation process leverages ML/NLP models to analyze the simulation results and orchestration data.

To further understand the impact, a tracing module traces and records a chain of impacts starting from the target infrastructure 106, extending to the one or more application servers, then to the services operating on the application servers, and finally to the SDLC digital assets. This comprehensive tracing allows for a thorough examination of the dependencies and interactions within the system.

In an exemplary embodiment, when spikes in CPU utilization occur, the tracing module records a chain of impacts, allowing a developer to establish correlations between the affected server, the running application, and recent changes introduced. These changes may include user stories, associated source code, and their lineage from business requirements to operational impact. Based on the assessed impact, the intelligent resilience engineering module takes proactive actions, such as auto-scaling configuration and improved capacity planning, to address the situation.

In accordance with the exemplary scenario, the correlation process enables the predictive insights module to identify target infrastructure hotspots and provide actionable recommendations to site engineers and system administrators. These recommendations help forecast and mitigate potential damage to the infrastructure.

The predictive insights module 218 leverages a recommendation engine that configured to generate actionable recommendations for software application resiliency improvements, infrastructure adjustments, and preventive maintenance actions. These recommendations are based on identified patterns, potential vulnerabilities, and infrastructure hotspots.

FIG. 3 is a flow chart 300 illustrating a method for investigating the resiliency of a software application in accordance with an embodiment of the invention.

At step 302, the intelligent resilience engineering module 214 orchestrates chaos engineering in the target infrastructure 106 by identifying a plurality of business transactions associated with the software application operating within the target infrastructure 106. The target infrastructure includes one or more application servers.

At step 304, the intelligent resilience engineering module 214 determines one or more observability scenarios based on the plurality of business transactions associated with the software application. The intelligent resilience engineering module 214 leverages one or more ML models to determine observability scenarios.

At step 306, the intelligent resilience engineering module 214 identifies a set of chaos simulation scenarios and a target infrastructure for the software application, the target infrastructure comprising one or more application servers. These observability scenarios aid in the analysis and understanding of the system's behavior and performance during chaos engineering experiments. The intelligent resilient engineering module 214 leverages these scenarios to identify potential issues or areas of improvement. The observability scenarios may include, but are not limited to, CPU utilization, network latency, memory leaks, response time degradation, error rate analysis, and resource utilization distribution.

Following the determination of one or more observability scenarios, the intelligent resilient engineering module 214 proceeds to identify a set of chaos simulation scenarios. This identification is accomplished by utilizing advanced data analytics and the one or more ML models integrated into the system.

In one embodiment, the chaos simulation scenarios disclosed herein pertain to actions that impact the software components, infrastructure components, and/or resources required by the infrastructure components. These scenarios can involve various operations combined together to achieve the desired chaos impact on the target infrastructure 106.

Subsequently, the intelligent resilient engineering module 214 loads the selected set of chaos simulation scenarios from a database in response to determining the one or more observability scenarios. The database contains pertinent information related to the one or more chaos simulation scenarios.

At step 308, the intelligent resilience engineering module 214 injects the loaded set of chaos simulation scenarios into the target infrastructure 106.

At step 310, the intelligent resilience engineering module 214 simulates chaos attacks and the business transactions within the target infrastructure 106 based on the one or more chaos simulation scenarios and the one or more observability scenarios.

In an exemplary embodiment, the target infrastructure 106 within which the chaos attacks are simulated can be a plurality of network-attached devices such as routers, switches, hubs, firewalls, workstations, databases, printers, and wireless access devices.

In In an embodiment, the intelligent resilience engineering module 214 is configured to implement an agentless simulation. This capability allows for the simulation of chaos scenarios within client premises without causing any disruption.

In another embodiment, the intelligent resilience engineering module 214 is also configured to implement simulation using cloud-based services. This allows for the simulation of chaos scenarios through remote services, providing flexibility and scalability in conducting the simulations.

At step 312, the correlation module 216 correlates infrastructure telemetry data with SDLC digital assets based on the simulation and the orchestration by leveraging one or more ML/Natural Language Processing (NLP) models. By analyzing and correlating these data sets, insights can be derived regarding the relationship between infrastructure telemetry and the behavior of SDLC digital assets. Thereafter, the tracing module traces and records a chain of impacts starting from the target infrastructure 106, extending to the one or more application servers, then to the services operating on the application servers, and finally to the SDLC digital assets. This allows for a comprehensive understanding of the dependencies and interactions between different components within the system.

In some non-limiting embodiment, the telemetry data disclosed herein may encompass various types of data, including usage data, utilization metrics, error metrics, power information, and temperature information near the components of the target infrastructure 106. These different types of telemetry data may be obtained for each hardware component, its interface, and the node that houses the hardware component and its interface.

In an exemplary embodiment, SDLC digital assets refer to documentation, test plans, images, data files or executable modules, or a distortion in an image or sound caused by a limitation or malfunction in the hardware or software. In addition, assets of SDLC may also comprise design documents, data models, workflow diagrams, test matrices and plans, setup scripts, or the like.

Finally at step 314, a predictive insights module 218 predicts target infrastructure hotspots by correlating current behavior of the target infrastructure 106 and behavioral conditions inferred based on historical insights on similar chaos simulation scenarios.

The predictive insights module 218 leverages advanced analytics and ML algorithms to continuously identify at least one of patterns in performance of the software application, potential vulnerabilities and hotspots within the target infrastructure 106.

Subsequently, the recommendation engine utilizes insights derived from the predictive insights module 218, historical data correlation, and predictive analytics to provide recommendations and guidance to architects, site reliability engineers (SREs), and operations engineers to proactively engineer software applications to be resilient.

The present invention offers several advantages in the field of software resilience monitoring and issue detection. One key advantage is its proactive approach, allowing for the monitoring of software resilience and the detection of potential issues before they can cause significant damage. Additionally, the present invention is advantageous over existing products by not only performing chaos engineering but also providing proactive recommendations to resilience engineers in remote locations, enabling them to make informed decisions and take proactive actions.

Another advantage of the present invention is its utilization of advanced analytics and machine learning algorithms to continuously identify patterns in software performance, detect potential vulnerabilities, and identify infrastructure hotspots. By monitoring real-time infrastructure telemetry and correlating it with historical events and hotspots, the present invention facilitates proactive engineering of resilient applications, providing guidance to architects, site reliability engineers, and operations engineers.

By providing deep insights lead use cases such as intelligent root cause analysis, predictive maintenance, performance optimization, capacity planning, business transaction observability and insights to site engineers, the present invention helps in achieving increased uptime, improved user experience, reduced costs, compliance, better communication, and enhanced collaboration.

By identifying and resolving issues before they can impact the software's functionality, the present invention helps to increase the software's uptime and ensure that it is available and responsive to users when they need it.

Importantly, the present invention proactively identifies and resolves issues, leading to cost reductions associated with downtime, including lost revenue and support costs.

Those skilled in the art will realize that the above-recognized advantages and other advantages described herein are merely exemplary and are not meant to be a complete rendering of all of the advantages of the various embodiments of the present invention.

In the foregoing complete specification, specific embodiments of the present invention have been described. However, one of ordinary skill in the art appreciates that various modifications and changes can be made without departing from the scope of the present invention. Accordingly, the specification and figures are to be regarded in an illustrative rather than a restrictive sense. All such modifications are intended to be included within the scope of the present invention.

The invention claimed is:

1. A system for investigating resiliency of a software application, the system comprising:

a memory configured to store one or more executable components, the one or more executable components in communication with each other; and a processor operatively coupled to the memory, the processor configured to execute the one or more executable components comprising:

an intelligent resilience engineering module configured to orchestrate chaos engineering in a target infrastructure, wherein the intelligent resilience engineering module is configured to:

identify business transactions associated with the software application for determining one or more observability scenarios;

identify one or more chaos simulation scenarios and the target infrastructure for the software application, the target infrastructure comprising one or more application servers;

inject the one or more chaos simulation scenarios into the target infrastructure using agentless injection; and simulate and orchestrate chaos attacks and the business transactions in the target infrastructure based on the one or more chaos simulation scenarios and the one or more observability scenarios, wherein the simulation of the chaos attacks is agentless and is based on one or more active business transactions of the identified business transactions;

a correlation module configured to:

correlate infrastructure telemetry data with Software Development Life Cycle (SDLC) digital assets based on the simulation and the orchestration by leveraging Artificial Intelligence/Natural Language Processing (AI/NLP) models; and establish, based on the simulation, a correlation between the one or more application servers of the target infrastructure, applications executing on the one or more application servers, associated source code, and the SDLC digital assets to forecast hotspots within the target infrastructure; and a predictive insights module configured to;

compute metrics associated with the target infrastructure based on the injection of the one or more chaos simulation scenarios; and predict the hotspots within the target infrastructure based on the correlating, the computed metrics associated with the target infrastructure, and behavioral conditions inferred based on historical insights on similar chaos simulation scenarios.

2. The system of claim 1, wherein the intelligent resilience engineering module is configured to identify the one or more chaos simulation scenarios based on historical data and current release changes to the software application.

3. The system of claim 1, wherein the simulation is an agentless simulation enabling the simulation of the chaos attacks within client premises.

4. The system of claim 1, further comprising a tracing module in communication with the correlation module, wherein the tracing module is configured to trace and record a chain of impacts starting from the target infrastructure to the one or more application servers, then to services operating on the one or more application servers, and finally to the SDLC digital assets.

5. The system of claim 1, wherein the predictive insights module is further configured to leverage advanced analytics and machine learning algorithms to continuously identify at least one of patterns in performance of the software application, potential vulnerabilities, or the hotspots in the target infrastructure.

6. The system of claim 1, further comprising a recommendation engine configured to generate actionable recommendations for software application resiliency improvements, infrastructure adjustments, and preventive maintenance actions based on identified patterns, potential vulnerabilities, and the hotspots.

7. The system of claim 6, wherein the recommendations engine utilizes insights derived from the predictive insights module, historical data correlation, and predictive analytics to guide architects, site reliability engineers (SREs), and operations engineers to proactively engineer software applications to be resilient.

8. A method for evaluating resiliency of a software application, the method comprising:

orchestrating, by an intelligent resilience engineering module, chaos engineering in a target infrastructure, wherein the orchestrating comprises:

identifying business transactions associated with the software application for determining one or more observability scenarios;

identifying one or more chaos simulation scenarios and the target infrastructure for onboarding the software application, the target infrastructure comprising one or more application servers;

injecting the one or more chaos simulation scenarios into the target infrastructure using agentless injection; and simulating and orchestrating chaos attacks and the business transactions in the target infrastructure based on the one or more chaos simulation scenarios and the one or more observability scenarios, wherein the simulation of the chaos attacks is agentless and is based on one or more active business transactions of the identified business transactions;

correlating, by a correlation module, infrastructure telemetry data with Software Development Life Cycle (SDLC) digital assets based on the simulating and the orchestrating by leveraging Artificial Intelligence/Natural Language Processing (AI/NLP) models;

establishing, based on the simulation, a correlation between the one or more application servers of the target infrastructure, applications executing on the one or more application servers, associated source code, and the SDLC digital assets to forecast hotspots within the target infrastructure;

computing metrics associated with the target infrastructure based on the injection of the one or more chaos simulation scenarios; and predicting, by a predictive insights module, the hotspots within the target infrastructure based on the correlating, the computed metrics associated with the target infrastructure, and behavioral conditions inferred based on historical insights on similar chaos simulation scenarios.

9. The method of claim 8, wherein the identifying comprises determining the one or more chaos simulation scenarios based on historical data and current release changes to the software application.

10. The method of claim 8, wherein the correlating comprises tracing and recording a chain of impacts starting from the target infrastructure to the one or more application servers, then to services operating on the one or more application servers, and finally to the SDLC digital assets.

11. The method of claim 8, wherein the predicting comprises continuously identifying at least one of patterns in performance of the software application, potential vulnerabilities, or the hotspots in the target infrastructure by leveraging advanced analytics and machine learning algorithms.

12. The method of claim 8, further comprising generating, by a recommendations engine, actionable recommendations for software application resiliency improvements, infrastructure adjustments, and preventive maintenance actions based on identified patterns, potential vulnerabilities, and infrastructure hotspots.

13. The method of claim 12, wherein the generating comprises utilizing insights derived from the predictive insights module, historical data correlation, and predictive analytics to guide architects, site reliability engineers (SREs), and operations engineers to proactively engineer software applications to be resilient.

\* \* \* \* \*